Dec. 20, 1966  V. RAEBER ETAL  3,292,659
TRANSMISSION INSTALLATIONS
Filed Nov. 13, 1962  10 Sheets-Sheet 1
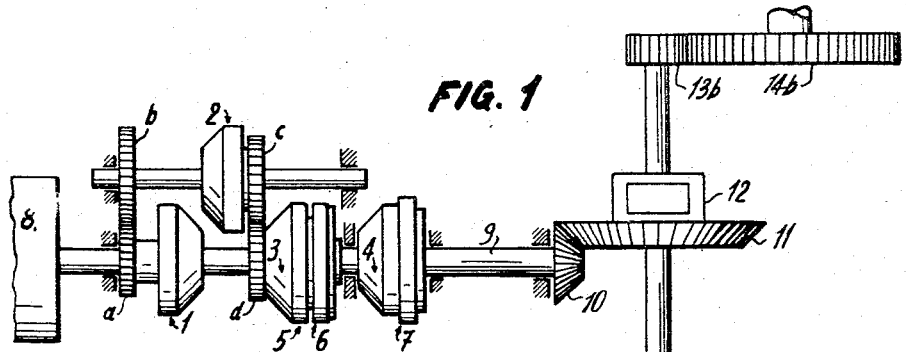
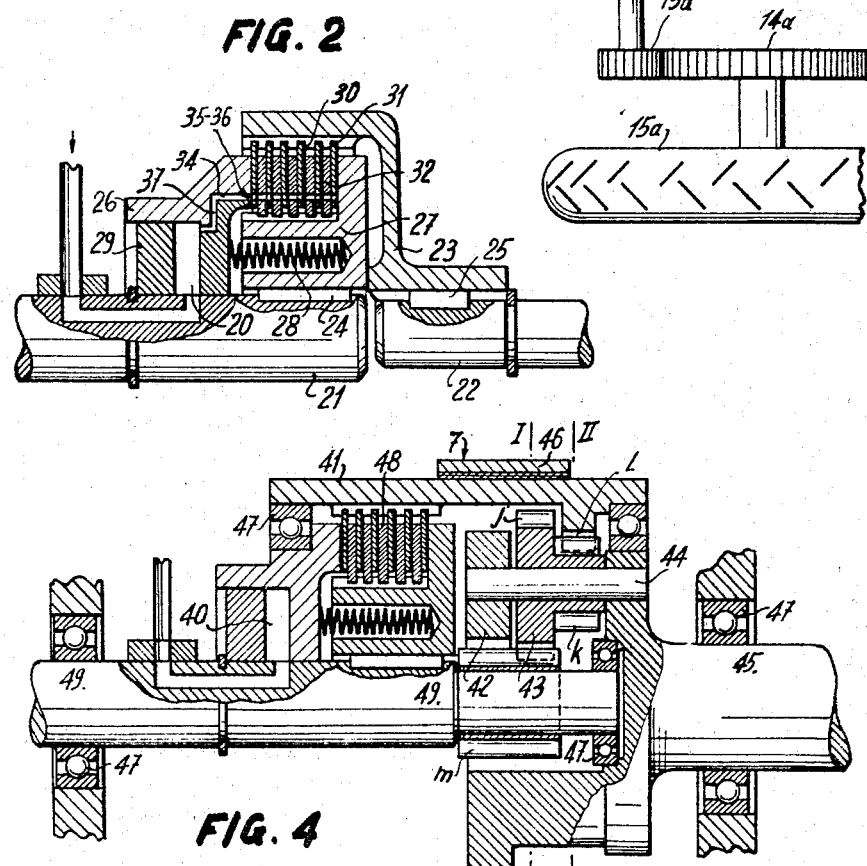
INVENTORS
VICTOR RAEBER
MAURICE BONJOUR

INVENTORS
VICTOR RAEBER
MAURICE BONJOUR

Dec. 20, 1966   V. RAEBER ETAL   3,292,659
TRANSMISSION INSTALLATIONS
Filed Nov. 13, 1962   10 Sheets-Sheet 4

INVENTORS
VICTOR RAEBER
MAURICE BONJOUR
BY

Dec. 20, 1966  V. RAEBER ETAL  3,292,659
TRANSMISSION INSTALLATIONS
Filed Nov. 13, 1962  10 Sheets-Sheet 5
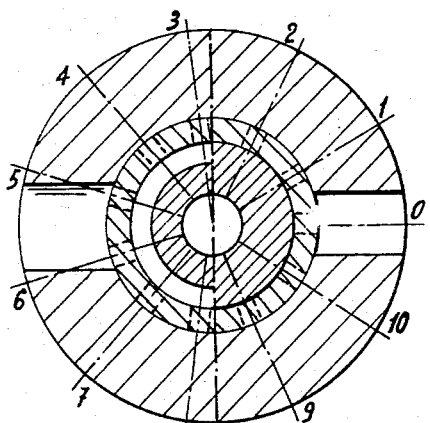
FIG. 9b
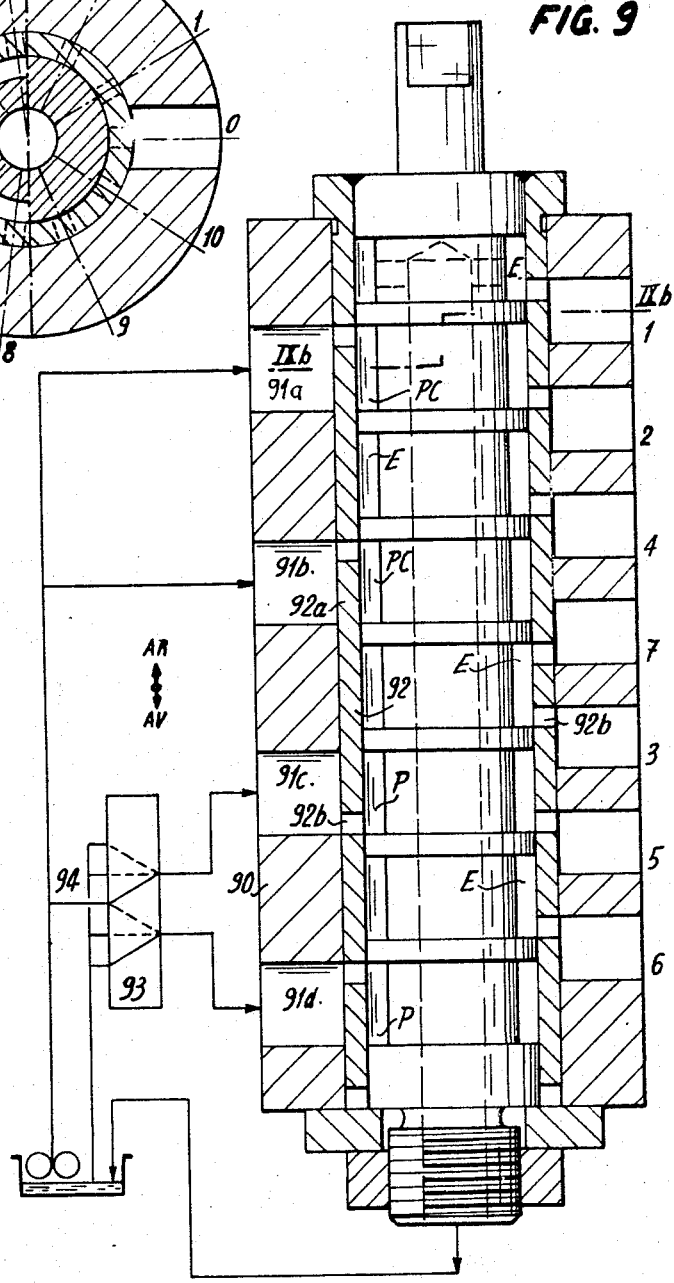
FIG. 9
INVENTORS
VICTOR RAEBER
MAURICE BONJOUR
By  Atty Dec. 20, 1966  V. RAEBER ETAL  3,292,659
TRANSMISSION INSTALLATIONS
Filed Nov. 13, 1962  10 Sheets-Sheet 7

INVENTORS
VICTOR RAEBER
MAURICE BONJOUR
By [signature] Atty

INVENTORS
VICTOR RAEBER
MAURICE BONJOUR
By

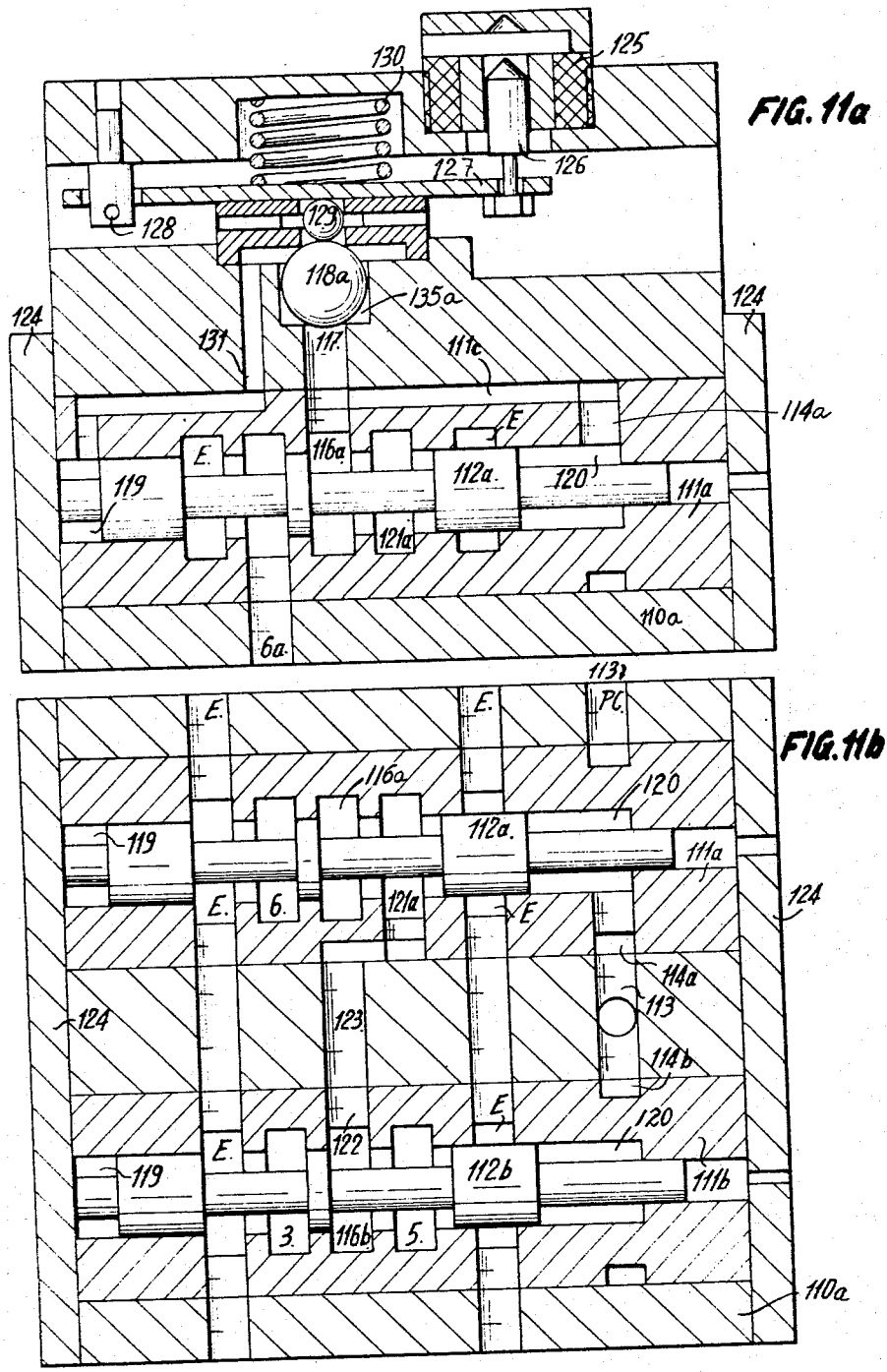

United States Patent Office 3,292,659
Patented Dec. 20, 1966

3,292,659
TRANSMISSION INSTALLATIONS
Victor Raeber and Maurice Bonjour, Vevey, Vaud, Switzerland, assignors to Ateliers de Constructions Mecaniques de Vevey S.A., Vevey, Vaud, Switzerland, a corporation of Switzerland
Filed Nov. 13, 1962, Ser. No. 236,824
Claims priority, application Switzerland, Nov. 17, 1961, 13,382/61
1 Claim. (Cl. 137—596.16)

The present invention concerns a transmission device arranged between two rotatable shafts of a machine, comprising a gear box including gear trains permanently in engagement and friction clutch devices presenting several transmission ratios, a selection device permitting the desired choice of ratio, by effecting engagement of the corresponding clutch devices, a clutch device permitting the choice of the direction of forward or reverse drive starting from neutral, characterized in that all the clutch devices are controlled by fluid pressure servo-motors, the selection device comprising at least one distributor for redistributing control fluid between the said servo-motors.

Such an installation is applicable, for example, in the constructions of fixed machines, especially machine tools and moving bodies such as automotive vehicles, lorries, tractors, etc.

The invention will now be described further, by way of example, with reference to the accompanying drawings, in which:

FIG. 1 is a schematic view of a gear box designed for use on an agricultural tractor;

FIG. 2 is an axial section through a plate type clutch device;

FIG. 4 is a section through a second type of friction clutch device with a planet pinion speed multiplier;

FIG. 9 is an axial section of a second embodiment of distributor;

FIG. 9b is a transverse section on the line IXb—IXb of of FIG. 9;

FIG. 11a is a longitudinal vertical section on the line XIa—XIa of FIG. 11;

FIG. 11b is a horizontal section on the line XIb—XIb of FIG.11; and

Figure 3:
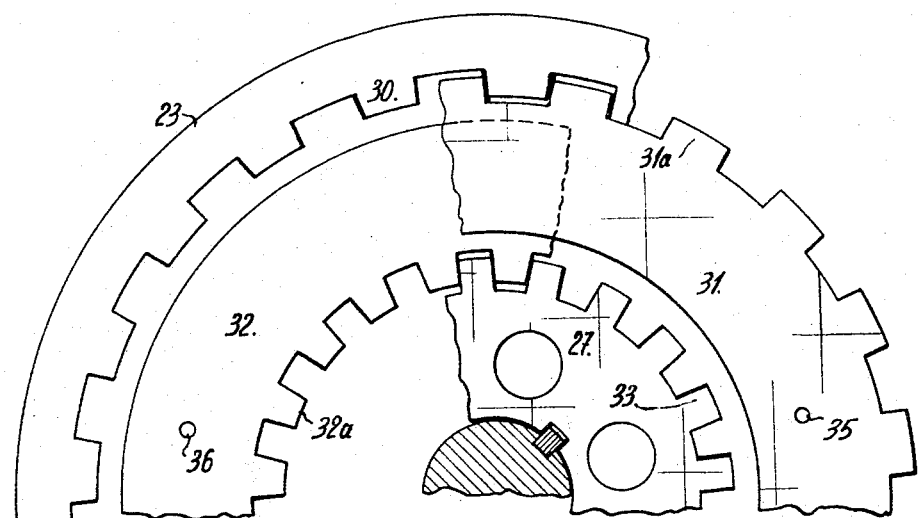
FIG. 3 is a detail of the clutch device shown in FIG. 2.

With reference to FIG. 1 the reference numerals indicated in this figure represent the following parts:

1 is a plate clutch called element No. 1.
2 is a plate clutch called element No. 2.
3 is a plate clutch called element No. 3.
4 is a plate clutch called element No. 4.
5 is a ribbon brake called element No. 5.
6 is a ribbon brake called element No. 6.
7 is a ribbon brake called element No. 7.
8 is an actuating motor.
9 is an output shaft.
10 is a driving bevel gear.
11 is a driven bevel gear.
12 is a differential.
13a is an output shaft of the left hand differential.
13b is an output shaft of the right hand differential.
14a is a right hand reducing gear.
14b is a left hand reducing gear.
15a is a left hand driving wheel, the right hand driving wheel not being visible in this figure.

The letters $a$, $b$, $c$, $d$ designate toothed wheels.
For convenience of description the following symbols are also used:

$O$ = the pitch diameter of the toothed wheel $a$.
$Za$ = the number of teeth in the toothed wheel $a$, and likewise for the toothed wheels $b$, $c$, $d$ ... $l$, $m$.

FIGS. 2 and 3 show, by way of example, a plate coupling of the type used for the elements 1, 2, 3 and 4, of FIG. 1.

In these figures the reference signs represent:
20 an oil chamber.
21 a shaft.
22 another shaft.

It is desired to couple or to uncouple as required these two shafts 21, 22.

23 represents an outer wheel carrying an inner toothing 30, this wheel 23 being secured to the shaft 22 by a key 25.

26 is a pressure cylinder.
27 is an inner wheel carrying an outer toothing 23, this wheel 27 being secured to the shaft 21 by a key 24.
28 is a set of springs.
29 is an axially fixed cylinder.

This friction clutch comprises large plates 31 carrying an outer toothing 31a meshing with the inner toothing of the wheel 23, consequently with the shaft 22.

The clutch likewise comprises a set of small plates 32 carrying an inner toothing 32a meshing on the toothing 33 of the wheel 27, consequently with the shaft 21.

The functioning of this clutch device is as follows:

When the chamber 20 is subjected to oil pressure, the pressure cylinder 26 is urged in the direction from left to right. This action has a tendency to compress the different plates or discs 31 and 32 together effecting frictional forces between the faces of all these plates. When the force of the piston 26 is sufficient to cause an overall friction in which the torque is equal to the torque of the motor, the relative slipping between the discs 31 and 32 disappears. These discs are then engaged or coupled, as are the shafts 21 and 22.

To summarise, to couple the shafts 21 and 22, it suffices to produce a pressure in the chamber 20. When this pressure disappears, the springs 28, mounted in housings made in the wheel 27, cause a force which has a tendency to displace the piston 26 from right to left. The pressures existing between the discs 31 and 32 disappear and the wheels 27 and 23, of which the shafts 21 and 22, turn independently one from the other; these shafts are released or uncoupled.

The connection of one such clutch element is fairly rough. To soften it, different processes are possible. For example, precautions could be taken, in such a manner that the oil pressure only appears slowly in the chamber 20.

Another solution has been considered and permits obtaining the desired effect. The pressure cylinder 26 is pierced by a channel 34, parallel to the prevailing axis by a conduit 37 for oil to the chamber 20. All the discs 31 are pierced by holes 35. All the discs 32 are pierced by holes 36. The holes 35 and 36 respectively are pierced, in a manner as to be aligned on an axis parallel to the axis of rotation. The method of operation is as follows:

After the coupling action, the chamber 20 is subjected to oil pressure as are the channels 34 and 37. The discs 31 are in relative movement with respect to the discs 32. Once per rotation the holes 35 and 36 are aligned. At this precise moment, a small quantity of oil is injected between all the faces of the discs 31 and 32. This oil lubricates the faces of the discs and, by that, the coefficient of friction is reduced. A frictional couple appears nevertheless, which has a tendency to rotate the driven elements. As the relative speed of rotation between the discs 31 and 32 diminishes; the number of injections likewise diminishes. When there is no more relative speed between the two sets of discs, there are no more injections of oil between them, because the first disc shuts off the channel 34. The coefficient of friction augments and obtains the value which it would have if the coupling had not been lubricated.

This process permits a gentle engagement of a plate type clutch device. It has moreover, the advantage of facilitating the supply of oil which penetrates into the coupling, the evacuation of calories which are developed as a result of this action.

Figure 5:
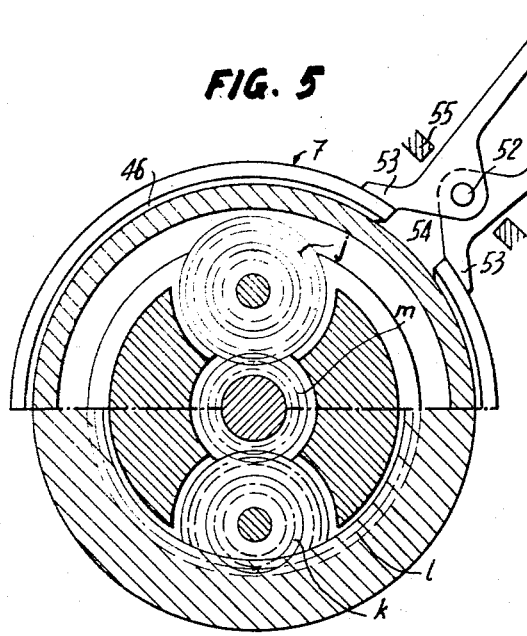
FIG. 5 shows in its upper part a transverse section on the line I—I of FIG. 4 and in its lower part a transverse section on the line II—II of FIG. 4.

FIGS. 4 and 5 represent a second type of friction clutch device with a speed multiplier having planet gears. This type of clutch device and gear multiplier is the one used for the elements 4 and 7 of FIG. 1.

This device comprises the following principal elements:

40 is an oil pressure chamber.

48 is a plate clutch functioning in the mirror image to that of FIG. 2, which is adapted to couple the shaft 49 to the wheel 41 which carries an inner set of teeth similar to the teeth 30 of the wheel 23 of FIG. 2.

41 is a wheel having inner teeth which carries a second set of inner teeth L.

42 is a ring secured to the shaft 45.

43 is a satellite which comprises in the same structure two sets of teeth $j$ and $k$.

44 is an axle mounted between the plate terminating the shaft 45 and the ring 42. The satellite 43 rotates on this axle.

FIG. 5 shows that there has been conceived two satellites in this case, thus two axles 44. It is evident that there could be more.

45 is a shaft.

46 is a cylindrical brake disposed on the periphery of the wheel 41 to permit the braking thereof. When the brake is tensioned it is applied on this wheel preventing its rotation.

47 is a set of ball bearings adapted to centre all the relatively rotating elements of this construction.

49 is a shaft.

50 is a servo motor actuated by oil pressure.

51 is a system of two levers.

The functioning of this assembly is as follows:

When oil under pressure is applied to the hydraulic servo motor 50 it has a tendency to expand. This movement causes the rotation of the two levers 51 around a common axis 52. This rotation causes the two ends 53 of these levers 51 to be drawn together. The ends 53 are fixed to the two extremities of the cylindrical brake 46 which is open at 54. The contraction of the ends 53 of levers 51 causes a reduction of the radius of the cylinder 46. This cylinder, which carries on its inner face a special packing, applies this packing to the periphery of the wheel 41. If the pressure is sufficient, the friction which appears between the wheel 41 and its brake 46 can lock the wheel 41 and prevent it from turning. In this case, the elements of the brake undergo a small rotation in the direction of the driving torque up to the time when they engage on one of the abutments 55 preventing the rotation of the brake.

The functioning of the planet reducer is as follows:

The shaft 49 ends in a toothed wheel $m$, on which meshes a toothing $j$ of the wheel 43. The toothing $k$ of this same wheel meshes on the inner toothing L of the wheel 41.

The assembly comprises a speed reducer if the shafts 49 and 45 are respectively driving and driven and inversely, comprises a speed multiplier if the shafts 45 and 49 are respectively driving and driven. The functioning of the system is well known. Two cases are possible:

(1) Oil under pressure is put into the chamber 40. In this case, the wheel 41 turns at the same speed as the shaft 49. The reduction ratio between the shafts 49 and 45 is 1. The passage is direct between the shafts 45 and 49.

(2) If the oil under pressure goes to the servo motor 50, the cylindrical brake 7 is applied. The speed of the wheel 41 is nil. The reduction ratio between the wheels is $$n_{45}=n_{49}\frac{1}{1+\frac{Z_L Z_j}{Z_k Z_m}}$$

In this equation, $n_{45}$ represents the speed of rotation of the shaft 45, $n_{49}$ the speed of rotation of the shaft 49. $Z_j$, $Z_k$, $Z_L$, $Z_m$ represent the number of teeth of the wheels $j$, $k$, L and $m$.

The element of FIG. 4 thus constitutes a speed change gear having two forward speeds controlled by oil under pressure.

Figure 6:
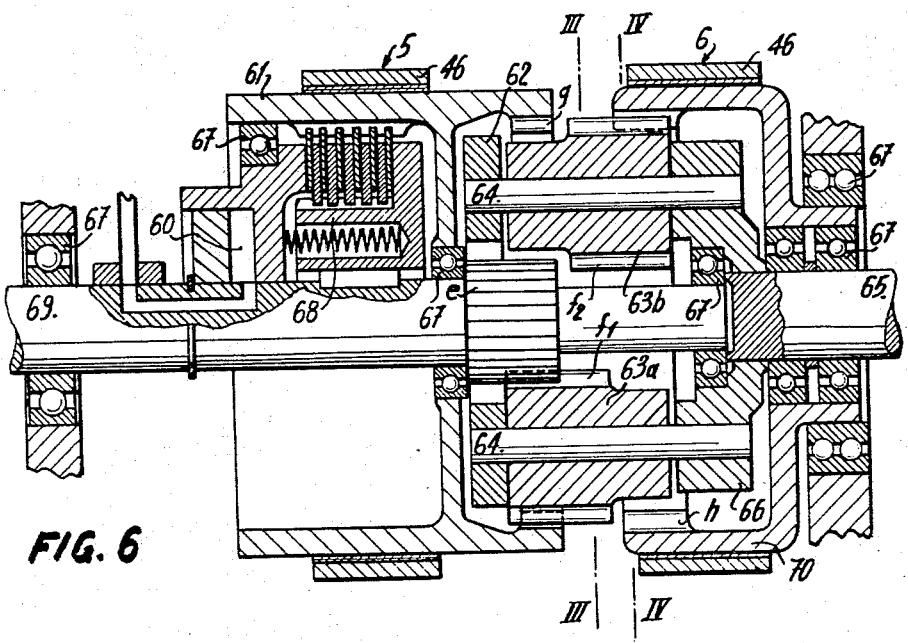
FIG. 6 is an axial section through another embodiment of a planet pinion speed multiplier, incorporating a reversing gear.

FIG. 6 represents another embodiment of speed multiplier applied to the elements 3, 5 and 6 of FIG. 1. It is another embodiment of a planetary speed multiplier which permits the incorporation of a reverse gear. This device comprises the following principal elements:

60 is an oil pressure chamber.

61 is a wheel carrying two inner sets of teeth namely, a first set adapted for a plate-type coupling device of the same type as that of FIG. 2, and a second wheel having inner teeth $g$. This wheel can be braked by means of cylindrical brake 5 of the same construction as the cylindrical brake 46 of FIG. 4.

62 is a ring secured to the plate which terminates the shaft 65.

63a is a satellite which meshes on the inner teeth $g$ of the wheel 61, on the second satellite 63b and on the outer teeth of the shaft 69.

63b is a satellite which meshes on the satellite 63a and on the teeth $h$ of the wheel 70 having inner teeth.

64 represents the axles of the satellites 63a and 63b.

65 is a shaft terminated by a plate 66 which carries the satellites.

67 is a set of ball bearings mounted on the different rotating elements so as to maintain them concentric.

68 represents a coupling device having plates identical to the one shown in FIG. 2. When the coupling device is tightened it causes the rotation of the wheel 61 at the same speed as that of the shaft 69.

69 represents a shaft having outer teeth $e$.

70 represents a wheel comprising an inner toothing $h$ and, on its outer cylinder, a brake similar to the brake 46 of FIGS. 4 and 5.

To summarise, oil under pressure can be applied at three places, thus in the chamber 60, which causes the rotation of the wheel 61 at the same speed as that of the shaft 69. The wheel 63a which meshes simultaneously on the shaft 69 having outer teeth e and the wheel 61 having inner teeth g turning at the same speed, does not turn on itself. Its speed of rotation on the shaft 64 is nil. It is the same with the satellite 63b which does not turn on its shaft. The wheel 70 carrying the inner teeth h thus turns at the same speed as the wheel 61. The speeds of the shaft 65 and 69 are equal.

Figure 7:
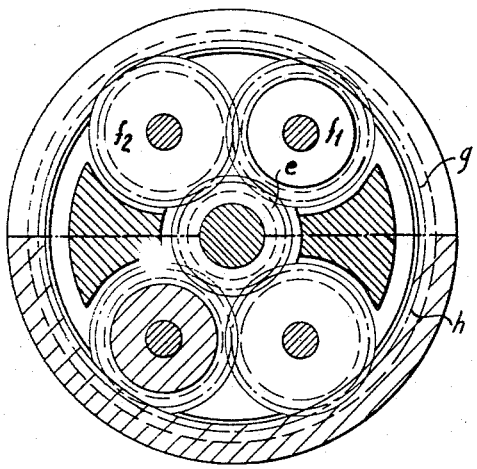
FIG. 7 shows in its upper part a transverse section on the line III—III of the multiplier shown in FIG. 6 and in its lower part a transverse section on the line IV—IV of FIG. 6.

Imagine that the pressure is put in the servo motor 50 corresponding to the brake 46 of the element 5. The speed of the wheel 61 is nil. Applying this reasoning to FIG. 7 shows that in this case the reduction ratio is the following:

$$n_{65} = n_{69} \frac{Z_e}{Z_e + Z_g}$$

The third case consists in locking the brake 46 of the element 6 by applying oil under pressure to the corresponding servo motor 50. In this case the device functions in reverse and the ratio of speeds is the following:

$$n_{65} = -n_{69} \frac{Z_e}{Z_h - Z_e}$$

Summarising, the element represented in FIG. 6 constitutes a device permitting the interlocking of two forward speeds and a third speed in reverse. If oil under pressure is not put into any of the servo motors, the shafts 65 and 69 are uncoupled which constitutes a neutral point.

Recapitulating with reference to FIG. 1 there can be seen four wheels which engage in pairs a, b, c, d. With the disposition which has been retained in this figure and taking into account the elements 1, 2, 3, 4, 5, 6 and 7, there can be seen that the assembly constitutes a box comprising eight forward speeds and four reverse speeds, of which the tables are given below:

TABLE OF FORWARD SPEEDS

| Element | 1 | 2 | 3 | 4 | 5 | 6 | 7 |
|---|---|---|---|---|---|---|---|
| Neutral 0 | 0 | 0 | 0 | 0 | 0 | 0 | 0 |
| Speed I | x | 0 | 0 | 0 | x | 0 | x |
| Speed II | 0 | x | 0 | 0 | x | 0 | x |
| Speed III | x | 0 | x | 0 | 0 | 0 | x |
| Speed IV | 0 | x | x | 0 | 0 | 0 | x |
| Speed V | x | 0 | 0 | x | x | 0 | 0 |
| Speed VI | 0 | x | 0 | x | x | 0 | 0 |
| Speed VII | x | 0 | 0 | x | 0 | 0 | 0 |
| Speed VIII | 0 | x | x | x | 0 | 0 | 0 |

TABLE OF REVERSE SPEEDS

| Element | 1 | 2 | 3 | 4 | 5 | 6 | 7 |
|---|---|---|---|---|---|---|---|
| Neutral | 0 | 0 | 0 | 0 | 0 | 0 | 0 |
| Speed I | x | 0 | 0 | 0 | 0 | x | x |
| Speed II | 0 | x | 0 | 0 | 0 | x | x |
| Speed III | x | 0 | 0 | x | 0 | x | 0 |
| Speed IV | 0 | x | 0 | x | 0 | x | 0 |

The first line defines the columns by the indices 1 to 7.

These indices correspond to the elements 1 to 7 shown in FIG. 1.

The crosses situated in the columns indicate that the corresponding element must be put under oil pressure. The control of the speeds is reduced in this case to the one of distribution of oil under pressure corresponding to the diagram specifically given in the two above tables.

Figure 8:
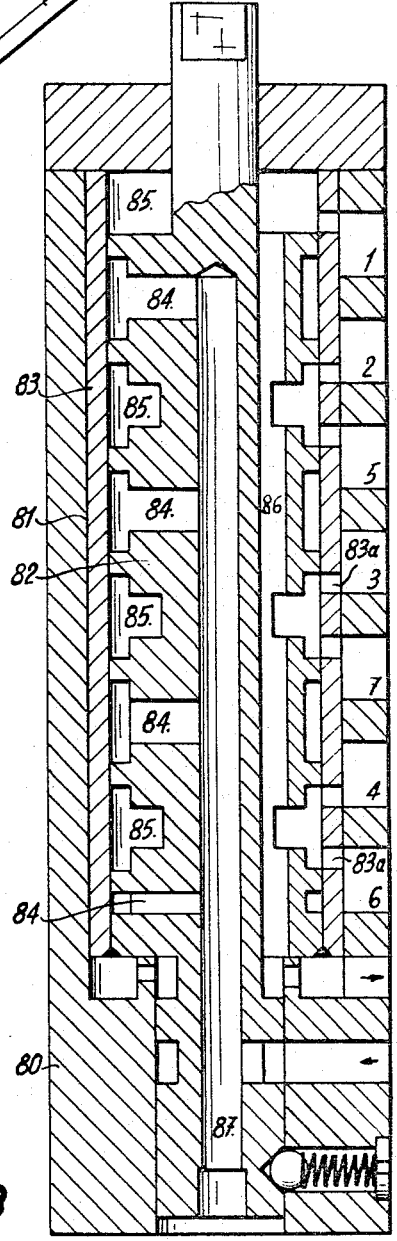
FIG. 8 is an axial section through a first embodiment of distributor.

Different solutions are possible to effect this distribution. FIG. 8 shows an embodiment of distributor permitting the control of these speeds. The valve is constituted by a fixed body 80 in which there is machined a cylindrical bore 81. On one of the sides, a series of holes are made which put the outside of the body in communication with the face of the bore. The numerals 1 to 7 indicated on these holes correspond to the distribution of oil, that is to say the numeral 1 signifies that this pressure intake is connected with the hydraulic servo motor of the element 1 of FIG. 1 and likewise for the following seven elements.

Figure 8A:
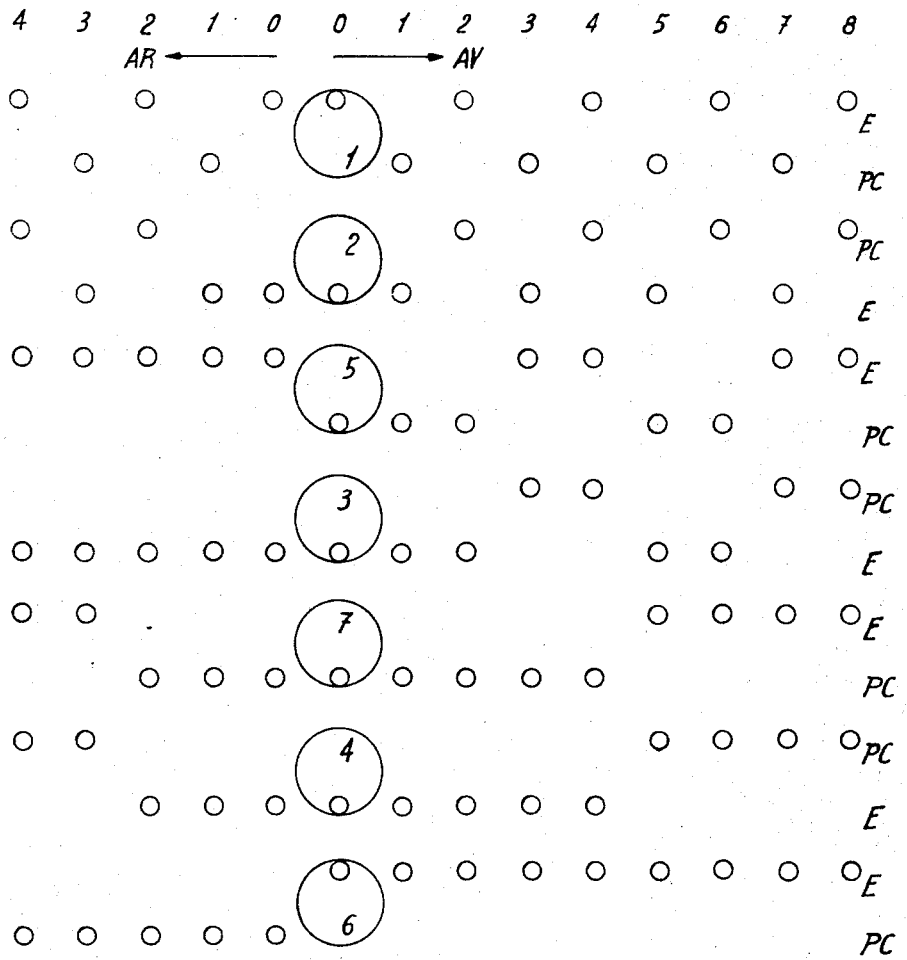
FIG. 8a is a development of the surface of the distributor situated at the exterior of its moving mechanism.

An arrival of pressure originating from an oil pump feeds, by an orifice, the axle of a rotating body 82. Different chambers 84 machined in this body 82 are relayed to the axial orifice 87 and are put under oil pressure. Other grooves 85 are made in this body 82 and by means of one or several vertical conduits 86 are put to free exhaust. This body 82 is in turn clad in a cylinder 83 mounted without play and of which the outer surface is machined in a manner that it can turn freely without jamming in the bore 81 of the fixed body 80. The play existing between this bore 81 and the diameter of the cylinder 83 is small, so that the escape of oil is reduced. This cylinder 83 itself is pierced by a series of small holes 83a. FIG. 8a represents the development of the external wall of this cylinder 83. In turning around its axis, the body 82 and the cylinder 83 which is secured thereto causes each of the conduits 1 to 7 formed on the exterior edge of the distributor alternatively to be subjected to pressure and to be released therefrom. A distribution of oil giving a predetermined forward speed corresponds to one predetermined angular position of the rotating body 82 of the distributor with respect to the fixed body 80.

The development, FIG. 8a, shows that the arrangement under discussion possess two neutral positions designated by O, eight forward speeds on the right of the drawing and four reverse speeds on the left of the drawing. On the right of the development are shown the indications E which signify that holes in this series are always in connection with oil without pressure, i.e. connected to exhaust, while the holes PC indicate that they are always in connection with the constant pressure which emanates from the pump. For ready reference there has been shown beneath each of the numerals in the top line, a series of vertically arranged circles corresponding to a neutral point, said series of circles corresponding to the conduits which relate to the seven elements 1 to 7 in accordance with FIG. 1.

When the rotatable body 82 is displaced by full stages with respect to the fixed body 80 the little holes 83a are displaced and the distribution of oil is assured conforming to the diagram. This device permits effecting control of the eight forward speeds and of the four reverse speeds. It is to be noted that the distribution is effected in such a manner that no error is possible. In effect, FIG. 1 shows that the elements 1 and 2 cannot, for example, be put under pressure simultaneously because, if they were connected, there would be a tendency to turn simultaneously two different speeds of the output shaft 9. The same remark applies to the elements 4 and 7, 3, 5 and 6.

Figure 9A:
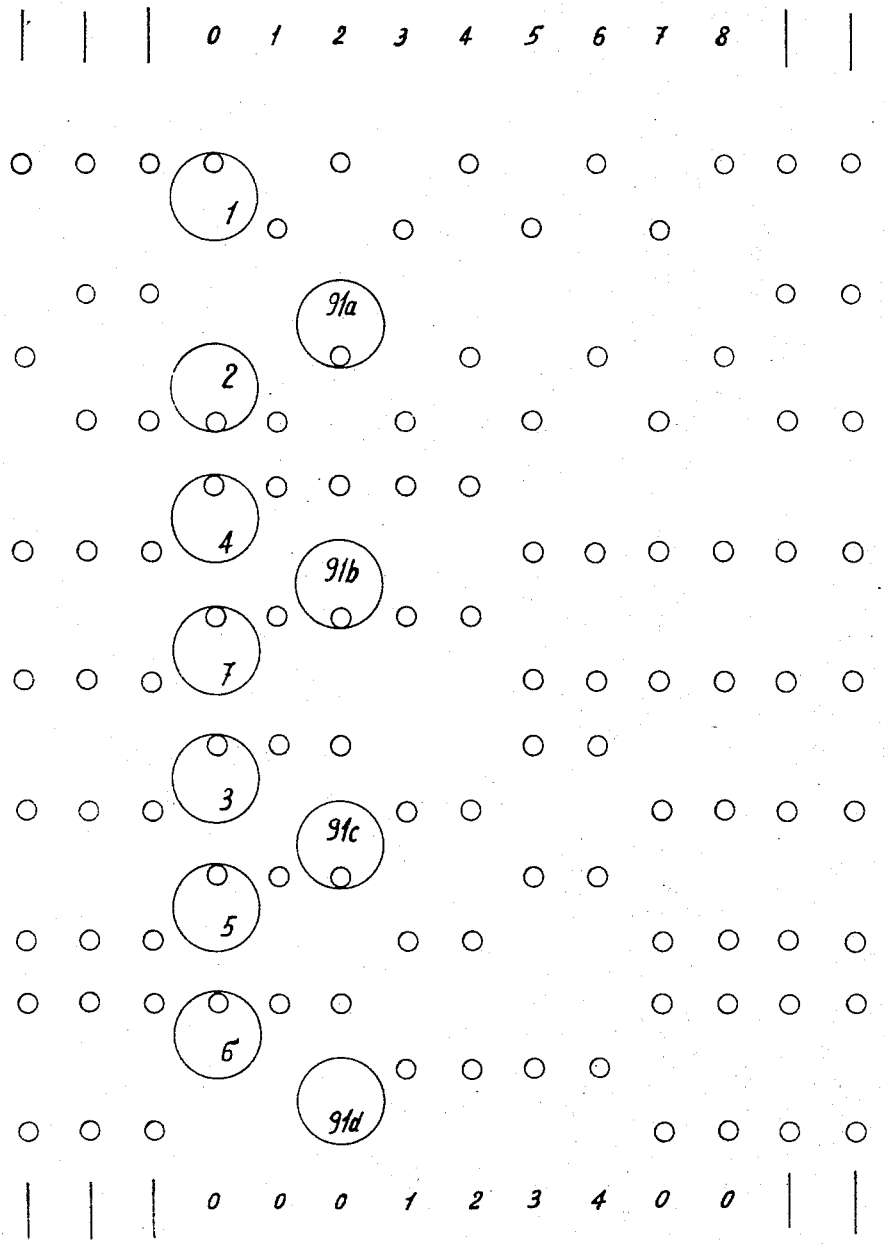
FIG. 9a is a development of a surface situated at the exterior of its moving mechanism.

Another possible solution for the control of the speeds is represented in FIGS. 9, 9a, 9b. This construction is in principle similar to the preceding one. It comprises a fixed body 90 and a rotatable distributor element 92. A difference exists in the feed where the constant pressures are separated. In effect, the pressure arrives permanently in the two conduits 91a and 91b, while they only arrive on demand in the conduits 91c or 91d. The holes 92b and the cylinder 92a, which is secured to the distributor element 92, are different from the preceding case; the development of its exterior wall is represented in FIG. 9a. A series of seven orifices designated 1 to 7 are machined in the body 90. They feed the seven elements corresponding to the diagram of FIG. 1. A second series of four holes marked 91a, 91b, 91c, 91d represent the feed under pressure of the different stages of this distributor. In the case of selection of forward motion, the pressure of oil is distributed to the holes marked 91a, 91b and 91c whilst the hole 91d is in connection with the exhaust. The element 93 represents a small auxiliary three position distributor; it comprises a constant pressure feed 94 and two exits connected to the conduits 91c and 91d. In the upper position of the valve of the distributor 93, the pressure comes to the element 91d while the conduit 91c is put to exhaust. In the medial position the two conduits 91c and 91d are connected to exhaust, while in the lower position the pressure oil arrives in the conduit 91c; the conduit 91d is connected to exhaust. The distribution of the little holes 92b machined in the cylinder 92a, is made in such a manner that the fed under pressure corresponds to that desired for the servo motors of the elements 1 to 7.

In this case, when it is desired to make a tractor function at a predetermined speed, the angular position of the turning element of the distributor 92 is selected with respect to its body 90 corresponding to the desired speed, then the order to move forward or to reverse is given with the aid of the distributor 93.

If for example the position of third forward gear is selected, there is ascertained from the hole while passing to the order of reverse gear, that the first speed of reverse gear would be connected. Likewise to the gears IV, V and VI of forward drive corresponding respectively to the gears II, III and IV of reverse drive. The gears I, II, VII and VIII of forward drive correspond to a neutral point of reverse drive.

With this device, the desired operating gear is selected, then and the order of action in forward or reverse gear is given in accordance with the requirement. It is to be noted that direct passing from forward to reverse drive can be effected without inconvenience of the gear box and the distribution, since the gears are always synchronised.

Another manner of the piercing of the cylinder 92a could have been chosen which would have given another position of reverse gears. This element constitutes on the whole a memory device. In effect, when the selection of the gear does not indicate an order to advance or reverse, the gear is first selected at which the vehicle is required to operate, then the order to operate is given. Each time that the gears are declutched, the valve 93 is returned to the point O and starting would always be made in the same gear if the position of the distributor was not altered.

Another embodiment based on the same principle is possible. It permits the selection of forward and reverse gears independently of one another. It comprises two rotatable distributors of the type of distributor 90, one reversed for forward gears and the other for reverse gears. These two distributors of the type 90 would constitute on the whole a memory and a distributor of the type 93 would constitute the order. This latter puts the rotatable distributor 90 into action corresponding to the order given to move forward or to reverse.

Another embodiment is possible in using a source of electric current for the remote control of one or several hydraulic distributors by means of electro-magnets.

Figure 10:
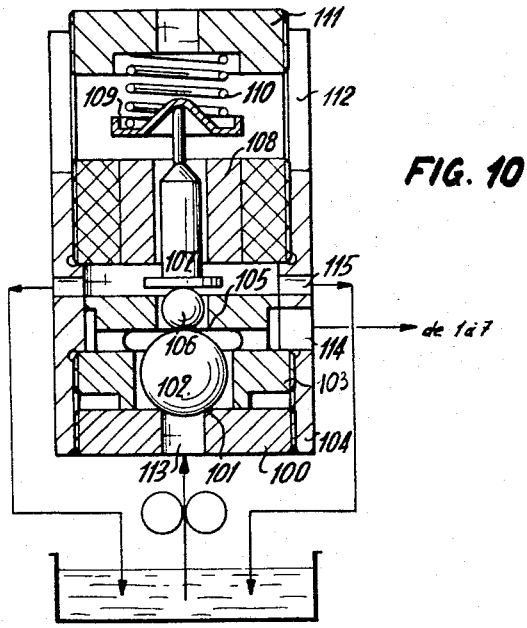
FIG. 10 is an axial section through a third embodiment of distributor having electro-magnetic control.

FIG. 10 represents a possible construction of such a distributor controlled electro-magnetically. This distributor comprises a body 100 in the interior of which is machined a seating 101 for a ball bearing 102. A threaded and machined socket 103 is mounted by the intermediary of a threaded tube 104 screwed on the body 100. In the interior of this socket, a chamber is machined permitting the passage of oil around the ball bearing 102. A second seating 105 for the ball bearing 102 is executed in the upper part of this socket 103. A second ball bearing 106 is mounted in the orifice of the seating 105 and rests on the ball bearing 102. A core 107 of an electromagnet 108 rests on this ball bearing 106. By the intermediary of a plate 109, a spring 110 abuts vertically below on the core 107. The distributor is closed by a cover 111. Two axial slots 112 are made in the upper part of the tube 104 for permitting the passage of electric leads. The oil under pressure originating from the pump arrives by the conduit 113. The conduit 114 is connected to use to either one of the elements 1 to 7 of FIG. 1. Several conduits 115 enable the chamber situated below the electro magnet 108 to be released from pressure. The functioning of the apparatus is as follows:

When the electro magnet 108 is not excited by an electric current, it does not exert any magnetic force on the core 107. The force originating from the spring 110, through the intermediary of the plate 109 of the core 107 and of the ball bearing 106, applies the ball bearing 102 to its seat 101. Since the diameter of this orifice is small, the pressure of engagement is sufficient to close the conduit 113 as long as it is in relation with the oil pressure. The conduit 114 is put to exhaust by means of play existing between the ball bearing 102 and its seat 105, by the play between the ball bearing 106 and the orifice of the seat 105 in which this ball bearing is placed, by the chamber situated below an electro-magnet coil 108 and by the orifices 115.

If, on the contrary, voltage is applied to the coil 108, a magnetic force is developed between this coil and the core 107 tending to lift this latter. This effort is capable, against the force of the spring 110 and the force which is exerted under the lower face of the ball bearing 102, of causing the displacement of this latter. This, entrained by the oil originating from the conduit 113 arrives, after a very small movement, to be applied on its upper seat 105. The oil pressure passes to the exterior of the ball bearing 102 and feeds by the channels the orifice 114 in relation to one of the elements to be put under pressure.

Seven elements identical to that of FIG. 10 enable the seven elements of FIG. 1 to be subjected to pressure. It is sufficient for the electric supply voltage to be distributed conveniently on the seven electro-magnets 108. The diagram 10a represents a diagram of the electric connections permitting the control of the gears.

This circuit causes three distinct elements to be interposed, such being:

A. A commutator having three positions and three stages permitting the selection of forward, neutral or reverse.

B. A commutator having eight positions and three stages permitting the selection of the eight forward gears.

C. A commutator having four positions and two stages permitting the choice of the four reverse gears.

The operator, in this case, can select independently one from the other the working gears of the machine, forward or reverse, execution only being effected once the order is given in the required direction by the first commutator A.

In the above diagram, a control error is not likely, but for unforeseen reasons, for example a defect in the insulation of one of the leads, it could happen that the electric current passes inopportunely into the electro-magnet of a distributor. This would have the result of causing the fortuitous coupling of one of the seven elements of FIG. 1. To avoid this danger a hydraulic locking is possible. It can be effected in accordance with the embodiment shown in FIGS. 11, 11a, 11b. In these figures there has been taken note of the case relative to the elements 3, 5 and 6 of FIG. 1, knowing that only one of these three can be under pressure, the two others being obligatorily connected to exhaust.

This distributor comprises a body 110a in which two sockets 111a and 111b are mounted. In these sockets different chambers are provided for oil distribution. A piston 112 slides in each of these sockets. The oil under pressure which arrives by the conduit 113, FIG. 11b, feeds the grooves 114a and 114b machined in the exterior of the two sockets 111a and 111b. A groove 111c is made along the length of the upper generatrices of each of the sockets 111a and 111b and connects the oil under pressure only with the chamber 116a. On the distributor there is mounted a system of two ball bearings 118a and 118b, of which the functioning is identical with that of the ball bearing 102 of FIG. 10. The difference resides in the fact that the axis of the electro-magnet 125 is offset with respect to the axes of the ball bearings 118a and 118b, so as to augment the course of the core 126 of the electro-magnet 125. This modification interposes a bar 127 which functions as a lever in abutting on the left on a fixed point 128 in the middle of the ball bearings 129 and on the spring 130 and on the right of the core 126 of the electro-magnet 125. The mark E appearing in certain of the chambers signifies that these are permanently connected to exhaust.

The conduits 117 feed the chambers 135a and 135b within which are situated the lower part of the ball bearings 118a and 118b. When the electro-magnet 125 is energised the pressure of oil arrives in the chambers 119 by a set of conduits 131. When the electro-magnet 125 is not energised, the ball bearings 118a and 118b are retained on their lower seatings by downward pressure of spring 130. The chambers 119 are without oil pressure however, pressure does exist in the chambers 120. This pressure creates a force on the pistons 112 which displaces them to the extreme left hand position as shown in FIGS. 11a and 11b.

In this case, the chamber 6a connected to the element 6 of FIG. 1 which corresponds to the control element for reverse gears is put to exhaust. On the contrary chamber 121a is put under oil pressure by the channel 116a.

A second groove 122 made in the socket 111b, feeds, by a conduit 123, the groove 116b of the socket 111b. If the second electro-magnet 125b which controls the piston 112b is likewise not energised this piston is on the left-hand side of its course. As a result the element 5 of FIG. 1 is under oil pressure, the element 3 being, as in element 6, put to exhaust.

If the electro-magnet 125a, which controls the piston 112a is energised, the ball bearing 118a is lifted and pressure exists in the chamber 119. The piston 112a is forced to the right, because the left-hand face of the piston 119 is larger than the opposite face corresponding to the chamber 120. At the end of the stroke this piston abuts against the cover 124. In this case, the conduit 6a is isolated from the exhaust and connected to the chamber 116a, thus put under oil pressure. The gear box then engages the reverse gears. Simultaneously, the chamber 121a is put in connection with exhaust to the right. It results that the conduit 123 of the chamber 116b is likewise to exhaust. Whatever the position of the piston 112b, the elements 3 and 5 are simultaneously set to exhaust.

In following the same reasoning on the electro-magnet 125 which controls the ball bearing 118b, it can be shown that when the element 3 is under oil pressure the elements 5 and 6 are likewise to exhaust. This distributor comprises on the whole a hydraulic locking of the control. This renders contrary orders impossible.

Figure 11:
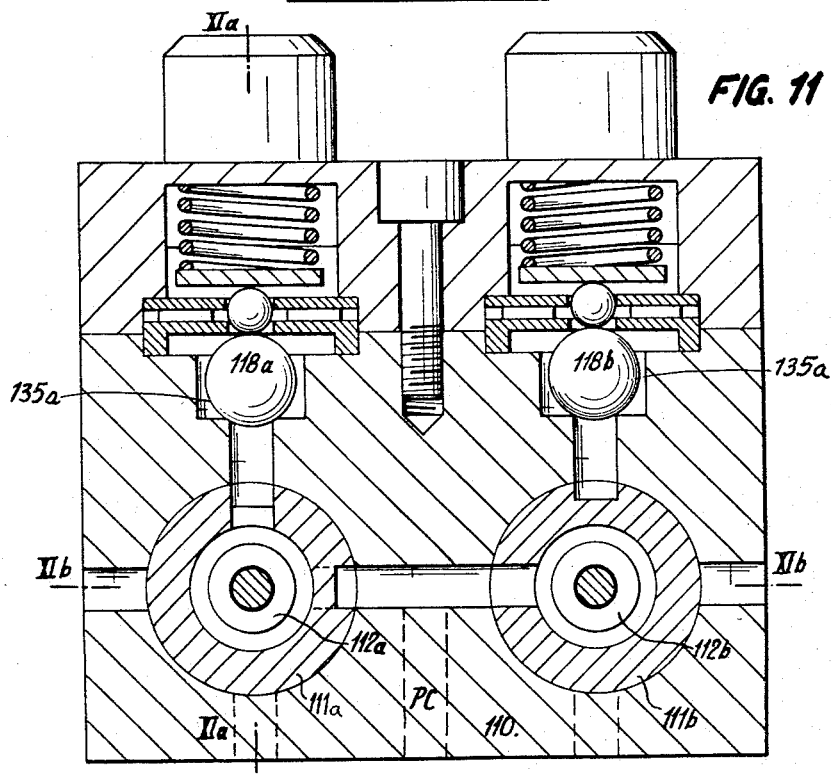
FIG. 11 is a transverse vertical section of a second embodiment of distributor having electro-magnetic control.
Figure 10A:
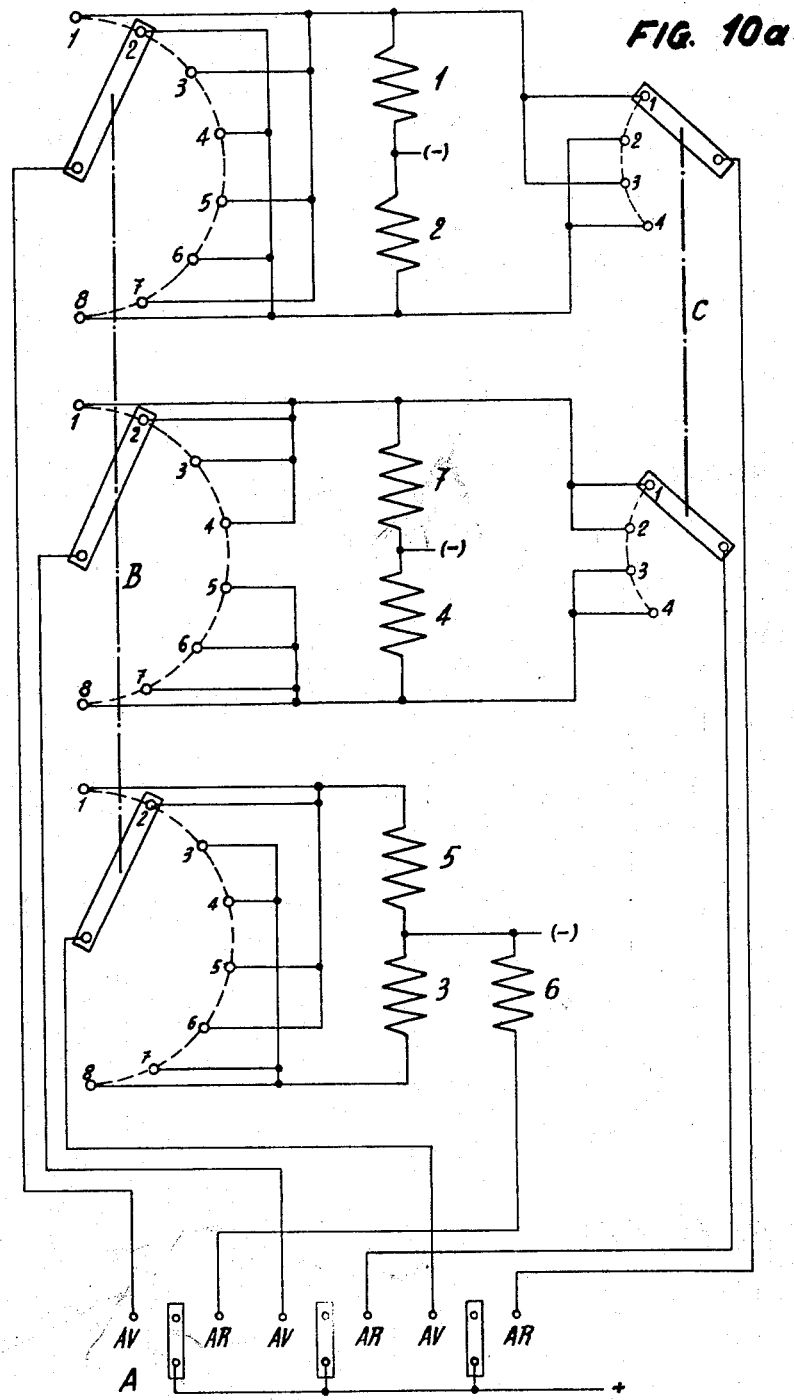
FIG. 10a is a diagram of the electric control circuit installation using distributors of the type shown in FIG. 10.

The distributor of FIG. 11 has been designed for the feed of elements 3, 5, 6. A similar construction, or in accordance with the case, very slightly modified is applicable, on the one hand to the elements 1 and 2 and on the other hand to the elements 4 and 9 which need never be engaged at the same time.

Figure 12:
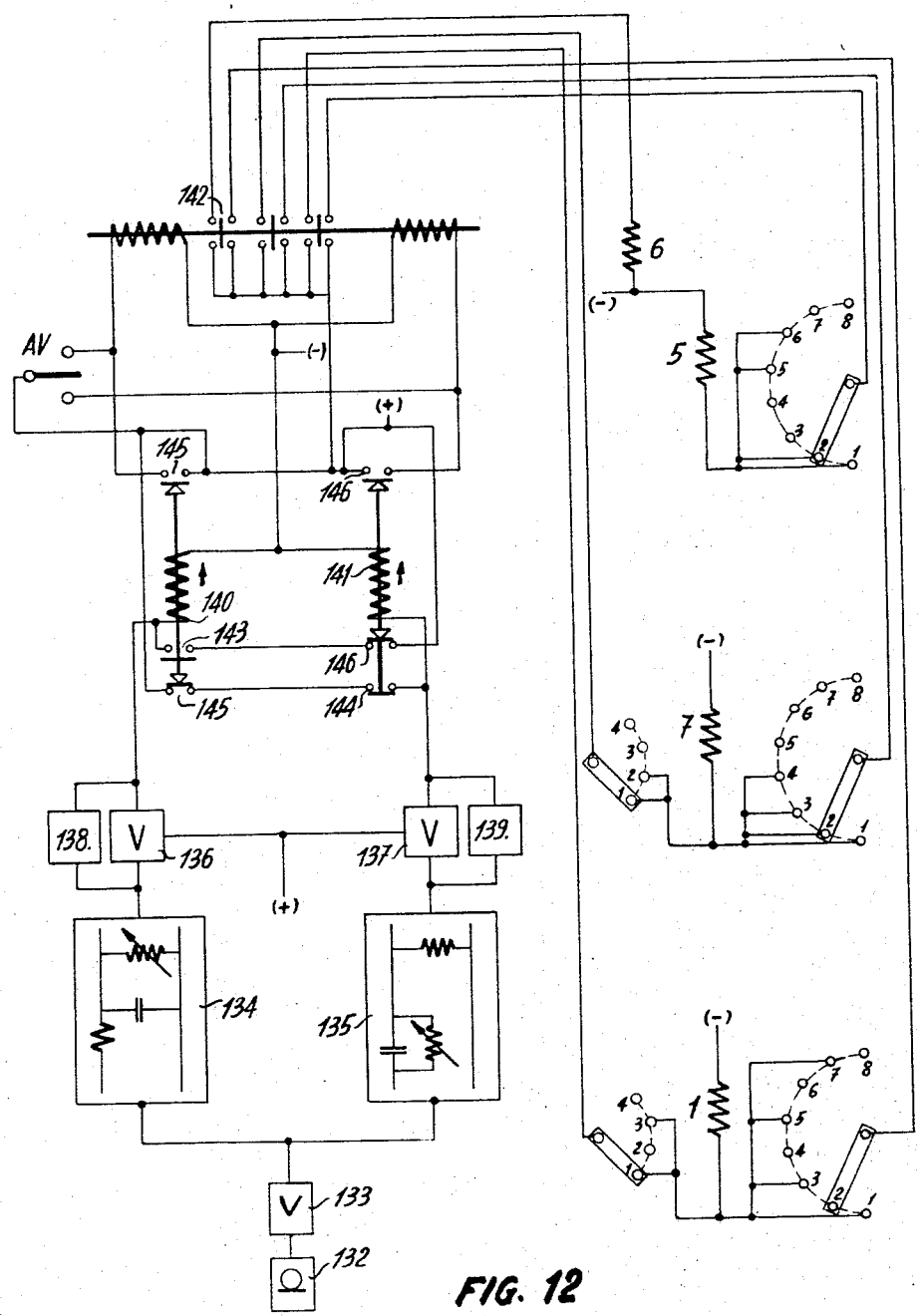
FIG. 12 is a diagram of an installation having electro-acoustic controls.

With such a disposition, the number of necessary electro-magnets 125 is reduced. In effect, one piston of the type 112a has two corresponding positions of functioning, thus controlling two gears by the electro-magnet 125. As a result, one of the electro-magnets distributing the oil pressure to the elements of FIG. 1, either 1 or 2, 4 or 7 and 3 or 5, can be omitted. The electro-magnet which controls the distribution to the element 6 is applicable for reverse gears. The diagram represented in FIG. 12 shows one possible solution in suppressing the electro-magnets controlling the elements 2, 3 and 4 of FIG. 1. This diagram presents again another difference. In effect, instead of employing a three-position commutator for giving neutral orders, thus stopping forward or reverse, one acoustic tele-control solution has been retained.

For an agricultural tractor, it can be of interest in certain cases, to avoid the need for the driver to mount the tractor to make it move forward only several metres, e.g. in the case of a farm worker standing upright on a trailer drawn by a tractor spreading manure on a field. By this acoustic device the farm worker can, without coming down from the trailer, advance, stop or put the tractor into reverse by a desired amount depending upon the gear which he will have previously chosen. The farm worker carries on his person a special whistle emitting two tones, the frequency of which is well chosen. The tractor comprises electric equipment, the elements of which are represented in the diagram of FIG. 12. A microphone 132 receives all the noises coming to it. It only transforms them into electric modulations as long as their volume is sufficient, so as to avoid parasitic noises which can play the role of an interference. This modulated current is amplified electronically at 133. It subsequently feeds two electric filters 134, 135 mounted in parallel. The first, 134, is a filter of the low pass type which as its name indicates only lets pass the modulated current for as long as its frequency is sufficiently low. The second 135, is the high pass type. It only lets pass modulated current of which the frequency is sufficiently high. Each of these filters 134, 135 feeds an output amplifier 136 and 137 respecitvely. The one 136 corresponding to the low pass filter 134 is equipped with a contra-reaction device 138 of the high pass type. The assembly constituted by the low pass filter 134, the output amplifier 136 and its contra-reaction high pass device 138 constitutes an element only allowing the passage of a modulated current, the frequency of which is situated in fairly narrow band, corresponding to the low tone emitted by the whistle. In the same way, the second high pass filter 135, the output amplifier 137 and its contra-reaction low pass device 139 only lets pass a modulated current the frequency of which corresponds to the high tone emitted by the whistle. Each output amplifier 136 or 137 respectively finally feeds an electric relay 140 or 141 respectively which shuts a series of contacts 142 used for registering the order.

Different solutions are possible to effect diagram of the electric connections. In this example the relays 140 and 141 are equipped with a holding contact 143 or 144 respectively and two temporary contacts 145 and 146 respectively, which only close their circuits after an adjustable predetermined time.

To summarise, when the driver emits a sharp sound with his whistle, it actuates the relay which, conforming to the diagram, actuates the forward movement of the tractor. The contacts 145 and 146 respectively judiciously placed on the relays 140 and 141 maintain this order until another contrary order appears. At this moment, a short whistle blast with a tone corresponding to the reverse movement stops the tractor. Inversely, to control the reversal of the tractor a deep tone whistle blast permits the obtaining and the maintaining just to the time when the sharp tone whistle blast annuls the order to reverse.

We claim:

In an automatic transmission including a plurality of servo-motors operatively connected with related drive mechanisms,
a fluid pressure distributor for controlling the flow of fluid from a source of fluid under pressure to selected servo-motors,
said distributor comprising,
a body (110a),
a pair of sockets (111a, 111b) within said body,
a first valve member (112a) slidably disposed in one of said sockets (111a) and a second valve member (112b) slidably disposed in the other of said sockets (111b),
means (113, 114a, 114b, 111c) supplying fluid under pressure to each of said valve members,
conduit means (123) providing a fluid connection between said valve members,
exhaust openings (E) in said body and communicating with each of said valve members, a chamber (135) communicating with each of said sockets, a ball valve (118a, 118b) in each of said chambers, spring means (130) normaly urging said ball valves into a seated position thereby preventing the flow of fluid through said slide valves, electromagnetic means (125a, 125b) associated with each of said ball valves to control the unseating thereof to permit the flow of fluid through said slide valves, conduit means connecting said first slide valve (112a) to one of said servo-motors (6), additional conduit means connecting said second slide valve (112b) to another two of said servo-motors (3, 5), whereby energising of a selected one of said electromagnetic means (125a, 125b) activates a related servo-motor by permitting the flow of fluid thereto and inactivates the other two servo-motors which are simultaneously set to exhaust through operation of said slide valves (112a, 112b).

References Cited by the Examiner

UNITED STATES PATENTS

| | | | |
|---|---|---|---|
| 782,547 | 2/1905 | Coffee | 74—761 |
| 992,967 | 5/1911 | Lever | 74—359 |
| 1,380,823 | 6/1921 | Matthews et al. | 192—113.2 |
| 2,407,699 | 9/1946 | Hill | 192—113.2 |
| 2,529,423 | 11/1950 | Schow | 74—754 X |
| 2,608,880 | 9/1952 | Flinn | 74—472.4 |
| 2,699,689 | 1/1955 | Ahlen | 74—740 |
| 2,749,772 | 6/1956 | O'Malley | 74—785 X |
| 2,751,799 | 6/1956 | Long | 74—769 |
| 2,825,362 | 3/1958 | Hicks | 137—596.16 |
| 2,852,948 | 9/1958 | Renick | 137—625.64 |
| 2,869,400 | 1/1959 | Langdon | 74—740 X |
| 2,890,603 | 6/1959 | Harris et al. | 74—740 |
| 2,912,007 | 11/1959 | Johnson | 137—625.64 |
| 2,923,175 | 2/1960 | Perkins | 74—740 |
| 2,949,131 | 8/1960 | Collins | 137—625.64 |
| 2,964,150 | 12/1960 | Chivari | 74—754 X |
| 3,010,342 | 11/1961 | Kelley | 74—754 |
| 3,016,769 | 1/1962 | Christenson et al. | 74—754 X |
| 3,025,718 | 3/1962 | Christenson | 74—754 |
| 3,033,333 | 5/1962 | Breting et al. | 74—760 X |
| 3,055,346 | 9/1962 | Hardesty et al. | 137—625.64 |

FRED C. MATTERN, Jr., *Primary Examiner.*

DON A. WAITE, DAVID J. WILLIAMOWSKY,
*Examiners.*

T. C. PERRY, *Assistant Examiner.*